US012730535B2

(12) United States Patent
Jang et al.

(10) Patent No.: US 12,730,535 B2
(45) Date of Patent: Sep. 8, 2026

(54) TOUCH DISPLAY DRIVING DEVICE AND TOUCH DISPLAY DRIVING METHOD

(71) Applicant: LX SEMICON CO., LTD., Daejeon (KR)

(72) Inventors: Moon Ho Jang, Daejeon (KR); Dean Yuan Huang, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 19/274,131

(22) Filed: Jul. 18, 2025

(65) Prior Publication Data

US 2026/0195007 A1 Jul. 9, 2026

(30) Foreign Application Priority Data

Jan. 9, 2025 (KR) ........................ 10-2025-0003751

(51) Int. Cl.
*G06F 3/041* (2006.01)
*G06F 3/044* (2006.01)

(52) U.S. Cl.
CPC ...... *G06F 3/041662* (2019.05); *G06F 3/0412* (2013.01); *G06F 3/0446* (2019.05); *G06F 2203/04106* (2013.01)

(58) Field of Classification Search
CPC ............ G06F 3/041662; G06F 3/0412; G06F 3/0446; G06F 2203/04106
See application file for complete search history.

(56) References Cited

U.S. PATENT DOCUMENTS 9,354,744 B2 5/2016 Johansson et al.
2014/0192018 A1* 7/2014 Kurasawa ............ G06F 3/0418 345/174
2016/0092010 A1* 3/2016 Agarwal .............. G06F 3/0412 345/173
2018/0188863 A1* 7/2018 Yi ........................ G09G 3/2092
2021/0064214 A1* 3/2021 Hsu ....................... G06F 3/0446
2023/0168773 A1* 6/2023 Jung .................. G06F 3/04166 345/173
2024/0393901 A1* 11/2024 Cho .................... G06F 3/04166

FOREIGN PATENT DOCUMENTS

KR 10-2013-0060539 A 6/2013
KR 10-2019-0028962 A 3/2019
KR 10-2093823 B1 3/2020

* cited by examiner

*Primary Examiner* — Nitin Patel
*Assistant Examiner* — Gloryvid Figueroa-Gibson
(74) *Attorney, Agent, or Firm* — ROTHWELL, FIGG, ERNST & MANBECK, P.C.

(57) ABSTRACT

A touch display driving device according to one aspect of the present disclosure capable of maintaining a touch coordinate report rate at a constant level even in a low-speed driving mode in which a display refresh rate decreases includes a touch driver that performs a touch scan for acquiring real touch coordinates when a touch synchronization signal that determines a touch scan period and a display driving period is at a first level; and a touch micro controller unit that reports virtual touch coordinates at an end point of a processing time for calculating the real touch coordinates, detects a level of the touch synchronization signal for each touch report cycle determined according to a predetermined touch coordinate report rate after the end point, and reports any one of the virtual touch coordinates and the real touch coordinates depending on the detected level of the touch synchronization signal.

20 Claims, 6 Drawing Sheets

Display Refresh Rate : 30Hz, Touch Scan Rate : 30Hz
Touch Report Rate : 120Hz
30Hz(33.33ms)
30Hz(33.33ms)
Vsync
Tsync
minimum
maximum
L
H
TST
DDT
PT_min
BT
PT_max
16.66ms
8.33ms
T1
T2
T3
T4
T5
MUXO
VTC1
VTC2
VTC3
RTC
VTC4
P1
P2(Dummy Blank)

TOUCH DISPLAY DRIVING DEVICE AND TOUCH DISPLAY DRIVING METHOD

CROSS-REFERENCE TO RELATED APPLICATIONS

This application claims priority to and the benefits of the Korean Patent Application No. 10-2025-0003751 filed on Jan. 9, 2025 which is hereby incorporated by reference in its entirety as if fully set forth herein.

BACKGROUND

Field of the Invention

The present disclosure relates to a display device, and more specifically, to an in-cell type touch display.

Discussion of the Related Art

As informatization progresses, various display devices capable of visualizing information are being developed. A liquid crystal display (LCD) device, an organic light-emitting diode (OLED) display device, a plasma display panel (PDP) display device, and the like are display devices which have been developed or are being developed. These display devices are evolving to be able to properly display high-resolution images.

Display panels configured in various electronic devices (for example: a television (TV), a notebook, a mobile device, and the like) frequently employ touch functions. In this case, the display panel may be implemented as a flat panel display device, and the touch function may be implemented by a touch panel combined with the display panel. The touch panel means a panel having a function of operating an electronic device or executing a program when a user presses text, images, icons, or the like using a finger or stylus pen.

The touch panel may be, for example, configured to perform touch recognition in a capacitive manner, and a "mutual capacitance-type touch sensing device" has been proposed as an example of a touch panel which implements capacitive touch recognition. For example, the touch panel has an independent configuration from the display panel and may be manufactured separately and combined with the display panel. As described above, the configuration in which the touch panel and the display panel are combined causes various difficulties such as process complexity, an increase in manufacturing costs, and the like.

To this end, the development of a device in which components for a display and components for touch recognition may be shared is being promoted, and an in-cell method is a representative example. The in-cell method means implementing touch recognition by having a configuration in which pixels of the display panel implement the touch function. The pixels implemented in an in-cell method perform both display and touch recognition. For example, in a device providing both a touch function and a display function (hereinafter, referred to as a "touch display device"), a touch operation and a display operation may operate in a time-division manner by a display driving signal and a touch driving signal.

When there is no change in the screen, the touch display device may operate in a low-speed driving mode (for example, LRR: a low refresh rate) which lowers a display refresh rate (a screen refresh rate) to reduce power consumption. In order to accurately detect a touch, even when the display refresh rate of the touch display device decreases, a touch coordinate report rate for acquiring touch coordinates should be maintained at a constant level regardless of a change in the display refresh rate. However, in the case of a general touch display device, when the display refresh rate decreases, the touch coordinate report rate may also decrease. For example, in the case of a general touch display device, when the display refresh rate decreases from 60 Hz to 30 Hz, since the touch coordinate report rate also decreases from 60 Hz to 30 Hz, there is a problem in that touch detection accuracy is lowered and thus touch performance deteriorates.

SUMMARY

The present disclosure is intended to solve the above-described problems, and is directed to providing a touch display driving device and a touch display driving method capable of maintaining a touch coordinate report rate at a constant level in a low-speed driving mode in which a display refresh rate decreases.

Further, the present disclosure is directed to providing a touch display driving device and a touch display driving method capable of reporting virtual touch coordinates or real touch coordinates to a host according to a level of a touch synchronization signal for each touch report cycle which is determined according to a touch coordinate report rate.

In addition, the present disclosure is directed to providing a touch display driving device and a touch display driving method capable of reporting touch coordinates for each constant cycle regardless of the number of touches.

A touch display driving device according to one aspect of the present disclosure for achieving the above-described technical problems includes: a touch driver that performs a touch scan for acquiring real touch coordinates when a touch synchronization signal that determines a touch scan period and a display driving period is at a first level; and a touch micro controller unit that reports virtual touch coordinates at an end point of a processing time for calculating the real touch coordinates, detects a level of the touch synchronization signal for each touch report cycle determined according to a predetermined touch coordinate report rate after the end point, and reports any one of the virtual touch coordinates and the real touch coordinates depending on the detected level of the touch synchronization signal.

A touch display driving method according to one aspect of the present disclosure for achieving the above-described technical problems includes: performing a touch scan to generate touch raw data during a touch sensing period in which a touch synchronization signal is maintained at a first level; generating real touch coordinates using the touch raw data; reporting virtual touch coordinates at a time point of generating the real touch coordinates; detecting a level of the touch synchronization signal for each touch report cycle determined according to a predetermined touch coordinate report rate; and reporting any one of the virtual touch coordinates and the real touch coordinates depending on the detected level.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
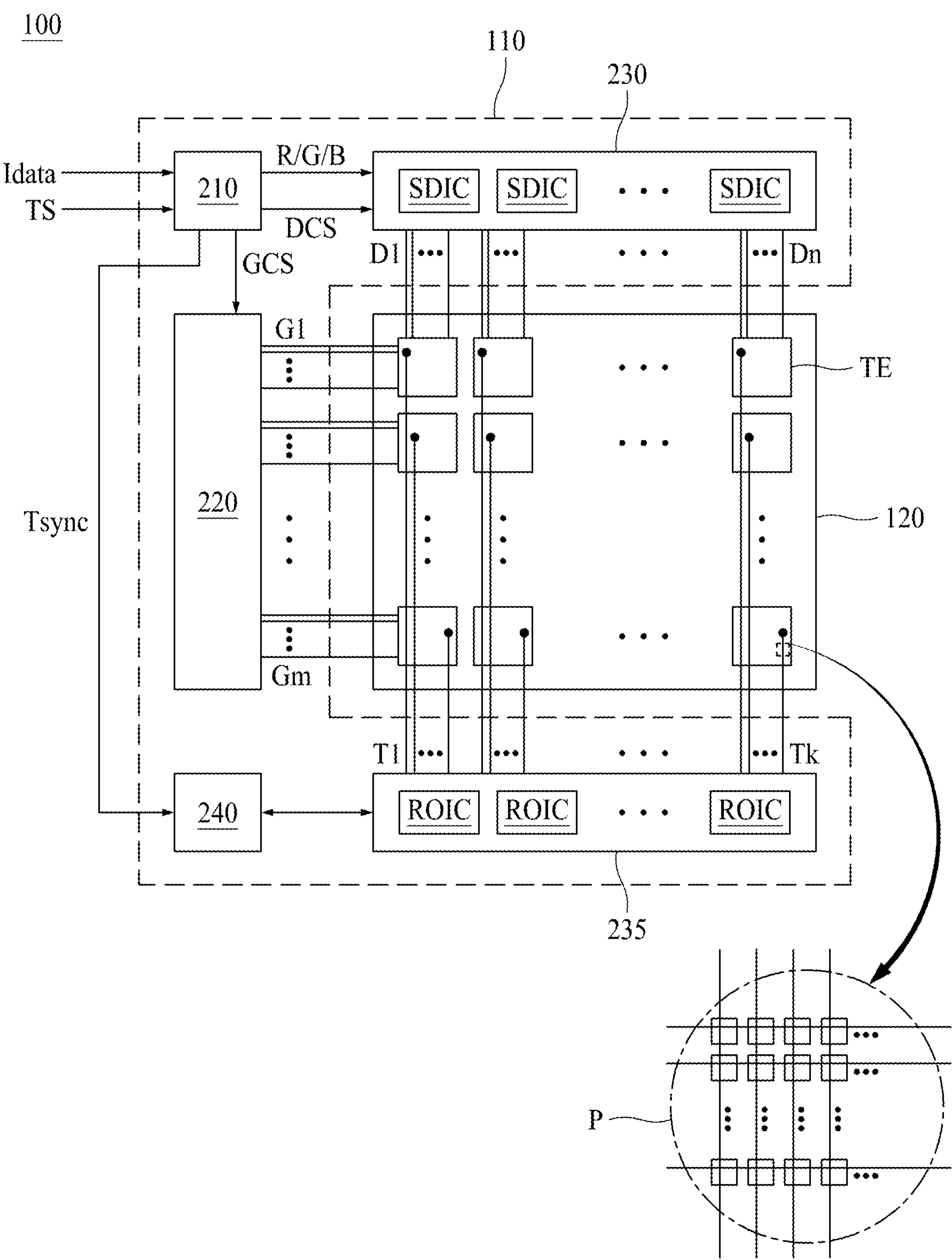
FIG. 1 is a block diagram of a touch display system including a touch display driving device according to one embodiment of the present disclosure.

Advantages and features of the present disclosure, and implementation methods thereof will be clarified through following exemplary embodiments described with reference to the accompanying drawings. The present disclosure can, however, be embodied in different forms and should not be construed as limited to the exemplary embodiments set forth herein. Rather, these exemplary embodiments are provided so that this disclosure will be thorough and complete, and will fully convey the scope of the present disclosure to those skilled in the art. Further, the present disclosure is only defined by scopes of claims.

Throughout the present disclosure, identical reference numerals refer to substantially identical elements. In the following description, when the detailed description of the relevant known function or configuration is determined to unnecessarily obscure the important point of the present disclosure, the detailed description will be omitted. In addition, the names of the elements used in the description below are examples and can differ from the names of the actual product corresponding to the elements.

In a case where 'comprise,' 'have,' and 'include' described in the present disclosure are used, another part can be added. The terms of a singular form can include plural forms unless referred to the contrary.

In construing an element, the element is construed as including an error range although there is no explicit description.

It will be understood that, although the terms "first", "second", etc. can be used herein to describe various elements, these elements should not be limited by these terms. These terms are only used to distinguish one element from another. Accordingly, a first element mentioned hereinafter could be termed a second element without departing from the scope of the present disclosure.

The term "at least one" should be understood as including any and all combinations of one or more of the associated listed items. For example, the meaning of "at least one of a first item, a second item, and a third item" denotes each of the first item, the second item, and the third item as well as the combination of all items proposed from two or more of the first item, the second item, and the third item.

Features of various exemplary embodiments of the present disclosure can be partially or overall coupled to or combined with each other and can be variously inter-operated or combined with each other and driven technically as those skilled in the art can sufficiently understand. The exemplary embodiments of the present disclosure can be carried out independently from each other, or can be carried out together in co-dependent relationship.

Hereinafter, exemplary embodiments of the present disclosure will be described in detail with reference to the accompanying drawings.

FIG. 1 is a block diagram of a touch display system including a touch display driving device according to one embodiment of the present disclosure.

A touch display system 100 shown in FIG. 1 performs display and a touch scan (or touch sensing) in a time-division method, and although components for the display and components for the touch scan may be shared in an embedded in-cell method, the present embodiments are not limited to the time-division method or in-cell method. For example, the touch display driving device of the embodiments described below may also be implemented in an on-cell method of an external method or embedded method.

According to various embodiments, the display and touch scan of the touch display driving device may be implemented as separate operations. Here, the display means expressing a desired image by driving pixels on a display panel, and the touch scan means recognizing a touch position on the display panel. Further, the time-division method means that the display and touch recognition are sequentially performed in an alternating manner by time domain. In one embodiment, the touch scan may be performed during a vertical blank period within one frame period.

The in-cell method means being implemented so that the display and touch scan may be simultaneously performed on the pixels in the display panel, and to this end, a shared component capable of providing capacitance for the touch scan may be used and may at least include a connection time point of the component. An example of the connection time point may be a node (COM) which applies a common voltage, but is not limited thereto, and various components may be used as the connection time point according to the intention of the manufacturer.

Meanwhile, the touch display system 100 according to the present disclosure may be used in a smartphone, tablet, notebook, or the like, and may provide a thin and lightweight design and implement a high-definition screen. According to the embodiment, the touch display system 100 according to the present disclosure may be a vertical blank (VBS) system.

As shown in FIG. 1, the touch display system 100 according to one embodiment of the present disclosure performs a display function and a touch scan function, and may include a flat panel display such as a liquid crystal display (LCD) or an organic light emitting diode display (OLED).

In one embodiment, the touch display system 100 according to the present disclosure may include a capacitance-type touch screen integrally implemented therein for sensing a touch by contact of a conductive object such as a finger or active pen. The touch screen may be configured independent of the display panel for implementing a display and may also be embedded in a pixel array of the display panel.

As shown in FIG. 1, the touch display system 100 according to one embodiment of the present disclosure includes a touch display driving device 110 and a panel 120 (hereinafter, described as a concept including a touch screen and a display panel). The touch display driving device 110 may include a timing controller 210, a gate driver 220, a data driver 230, a touch driver 235, and a touch micro controller unit 240.

The panel 120 displays a certain gray level image or receives touch input from a hand (or a finger) or a stylus pen (or an electronic pen). A plurality of data lines D1 to Dn connected to the data driver 230 and a plurality of gate lines G1 to Gm connected to the gate driver 220 may be formed on the panel 120. For example, the plurality of data lines D1 to Dn may be disposed in rows or columns, and the plurality of gate lines G1 to Gm may be disposed in columns or rows. Hereinafter, for convenience of description, it is assumed that the plurality of data lines D1 to Dn are disposed in rows and the plurality of gate lines G1 to Gm are disposed in columns.

Further, a plurality of pixels P may be defined at intersecting points of the plurality of data lines D1 to Dn and the plurality of gate lines G1 to Gm.

Each pixel P may be composed of red (R), green (G), blue (B), and white (W) sub-pixels. In one embodiment, each sub-pixel may be repeatedly formed in a row direction or may be formed in a 2*2 matrix form. In this case, a color filter corresponding to each color is disposed in each of the red (R), green (G), and blue (B) sub-pixels, whereas no separate color filter is disposed in the white (W) sub-pixel. In one embodiment, the red (R), green (G), blue (B), and white (W) sub-pixels may be formed to have the same area ratio, but the red (R), green (G), blue (B), and white (W) sub-pixels may also be formed to have different area ratios.

Each of the plurality of pixels P may be a liquid crystal display (LCD) pixel or an organic light-emitting diode (OLED) pixel, but is not limited thereto.

In one embodiment, the panel 120 may be a panel having an in-cell touch type structure using a capacitance method. According to the embodiment, the components for the display and the components for the touch scan may be shared in an in-cell method. For example, touch electrodes TE for detecting touch on a touch screen may be used as common voltage electrodes to which a common voltage is supplied from the display panel. Although an in-cell type panel is known as an integrated form in which the display panel and the touch screen are combined, this is only an example of the panel 120 described above, and the panel to which the present disclosure is applied is not limited to the in-cell type panel.

In one embodiment, the panel 120 may be an in-cell touch type panel using a self-capacitance method or an in-cell touch type panel using a mutual capacitance method.

Hereinafter, referring to FIGS. 2 and 3, the in-cell touch type panel using a mutual capacitance method and the in-cell touch type panel using a self-capacitance method will be described in more detail.

Figure 2:
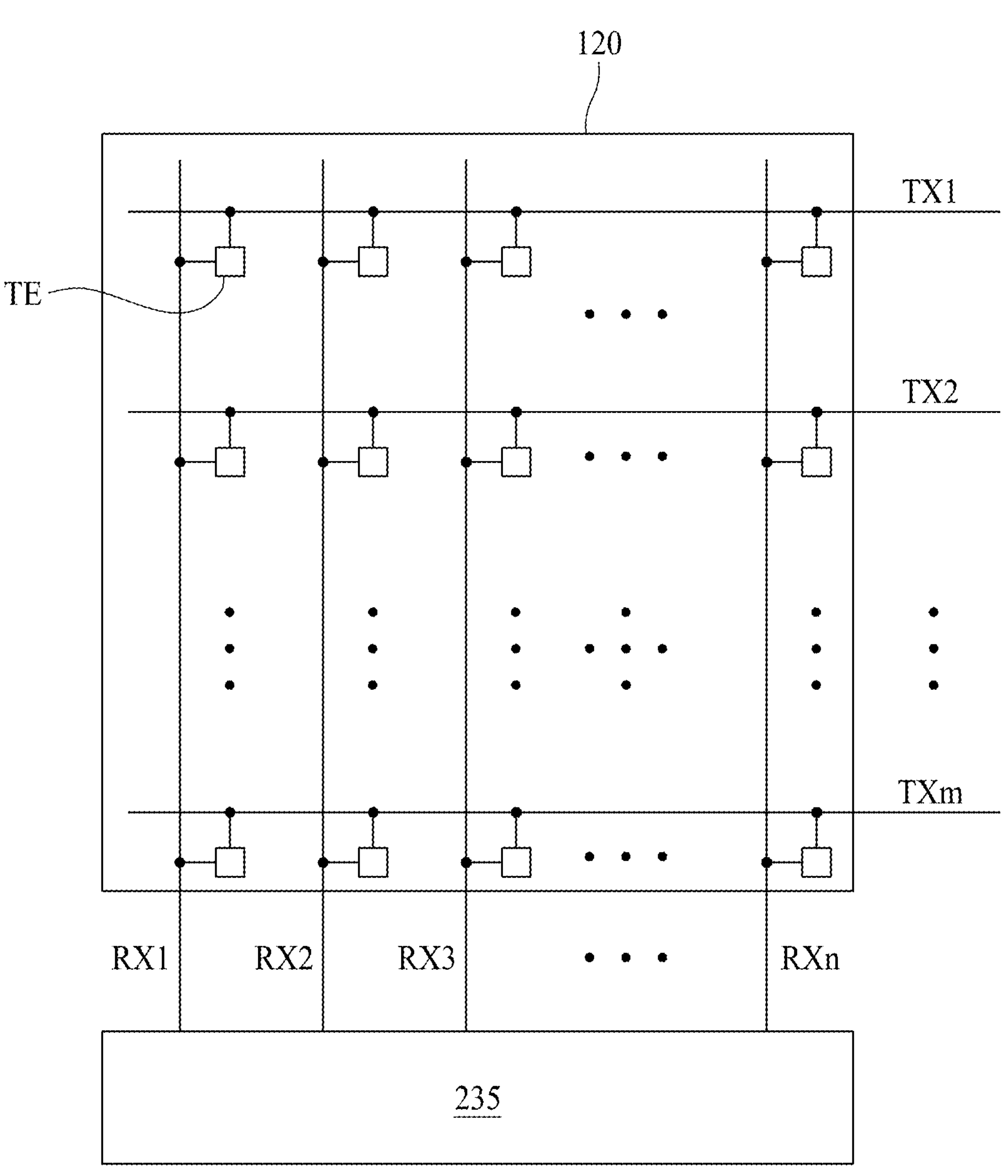
FIG. 2 is a view schematically showing an example of an in-cell touch type panel using a mutual capacitance method.

FIG. 2 is a view schematically showing an example of an in-cell touch type panel using a mutual capacitance method. As shown in FIG. 2, the panel 120 includes touch driving lines TX1 to TXm (m is a natural number greater than or equal to 2), a plurality of touch electrodes TE, and touch sensing lines RX1 to RXn (n is a natural number greater than or equal to 2).

The touch driving lines TX1 to TXm transmit touch driving signals to each of the touch electrodes TE. Each touch electrode TE may include a mutual capacitor. The touch sensing lines RX1 to RXn transmit voltages (or charges) of each of the touch electrodes TE to the touch driver 235.

The touch sensing lines RX1 to RXn may mean sensing lines of the panel 120 and may also be referred to as touch sensing channels.

Figure 3:
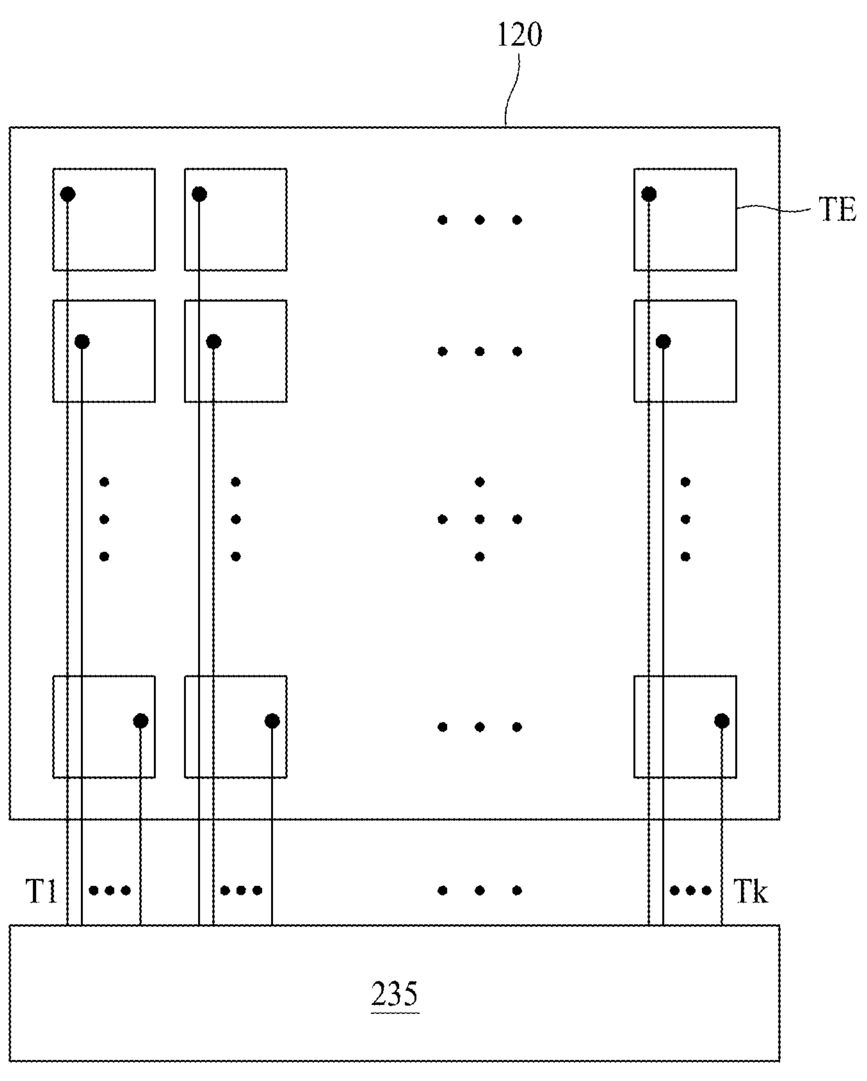
FIG. 3 is a view schematically showing an example of an in-cell touch type panel using a self-capacitance method.

FIG. 3 is a view schematically showing an example of an in-cell touch type panel using a self-capacitance method. In the self-capacitance touch method, which is another type of capacitive touch method, the supply of the touch driving signal and the reception of the capacitance generated by a user's touch or a touch of a stylus pen are implemented through one touch line among touch lines T1 to Tk.

In this self-capacitance touch method, a value sensed at the corresponding touch electrode TE changes depending on the touch or proximity of an object such as a finger, pen, or the like, and the self-capacitance touch method may detect the presence or absence of the touch, touch coordinates, or the like using the sensed value.

Referring to FIG. 1 again, the panel 120 may operate in a display driving mode and a touch scan mode. The panel 120 may display an image during the display driving mode and serve as a touch panel for a touch scan during the touch scan mode.

The timing controller 210 controls the operation of the data driver 230, the gate driver 220, the touch driver 235, and the touch micro controller unit 240 so that the display and touch scan are executed in a time-division method.

First, the timing controller 210 controls the data driver 230 and the gate driver 220 for display. The timing controller 210 may control the data driver 230 and the gate driver 220 by supplying various control signals DCS and GCS required for the driving operation of the data driver 230 and the gate driver 220.

The timing controller 210 starts a scan according to a timing implemented in each frame, converts image data Idata input from the outside into a data signal format used by the data driver 230, outputs the converted image data (R/G/B), and controls data driving according to the scan.

The timing controller 210 receives various timing signals TS including a vertical synchronization signal Vsync, a horizontal synchronization signal Hsync, an input data enable (DE) signal, a clock signal CLK, and the like along with the image data (R/G/B) from the outside (for example, a host system).

The timing controller 210 converts the image data Idata input from the outside into the data signal format used by the data driver 230 and outputs the converted image data (R/G/B), and additionally, in order to control the data driver 230 and the gate driver 220, the timing controller 210 receives the timing signals TS such as the vertical synchronization signal Vsync, the horizontal synchronization signal Hsync, the input data enable (DE) signal, the clock signal CLK, and the like, generates various control signals, and outputs the various control signals to the data driver 230 and the gate driver 220.

The timing controller 210 may be implemented as a component which is separate from the data driver 230, or may be integrated with the data driver 230 and implemented as an integrated circuit.

The timing controller 210 may generate a touch synchronization signal Tsync and transmit the touch synchronization signal Tsync to the touch driver 235 and the touch micro controller unit 240 to control the touch operation. The touch synchronization signal Tsync defines a display driving period in which the image is displayed and a touch scan period in which the touch scan is performed. In one embodiment, a period in which the touch synchronization signal Tsync is maintained at a first level (for example, a high level H) may be defined as the display driving period DDT, and a period in which the touch synchronization signal Tsync is maintained at a second level (for example, a low level L) may be defined as the touch scan period TST.

According to the embodiment, when the level of the touch synchronization signal Tsync is the first level (for example, the high level H), that is, in the display driving period DDT, the gate driver 220 and the data driver 230 may display an image corresponding to the image data (R/G/B) using the plurality of pixels P included in the panel 120 according to the control of the timing controller 210.

The timing controller 210 may transmit the above-described touch synchronization signal Tsync to general purpose input/output (GPIO) Pin of the touch micro controller unit 240.

In one embodiment, the timing controller 210 may detect a display refresh rate based on the vertical synchronization signal Vsync, generate the touch synchronization signal Tsync according to the detection result, and transmit the touch synchronization signal Tsync to the GPIO Pin of the touch micro controller unit 240.

Figure 5:
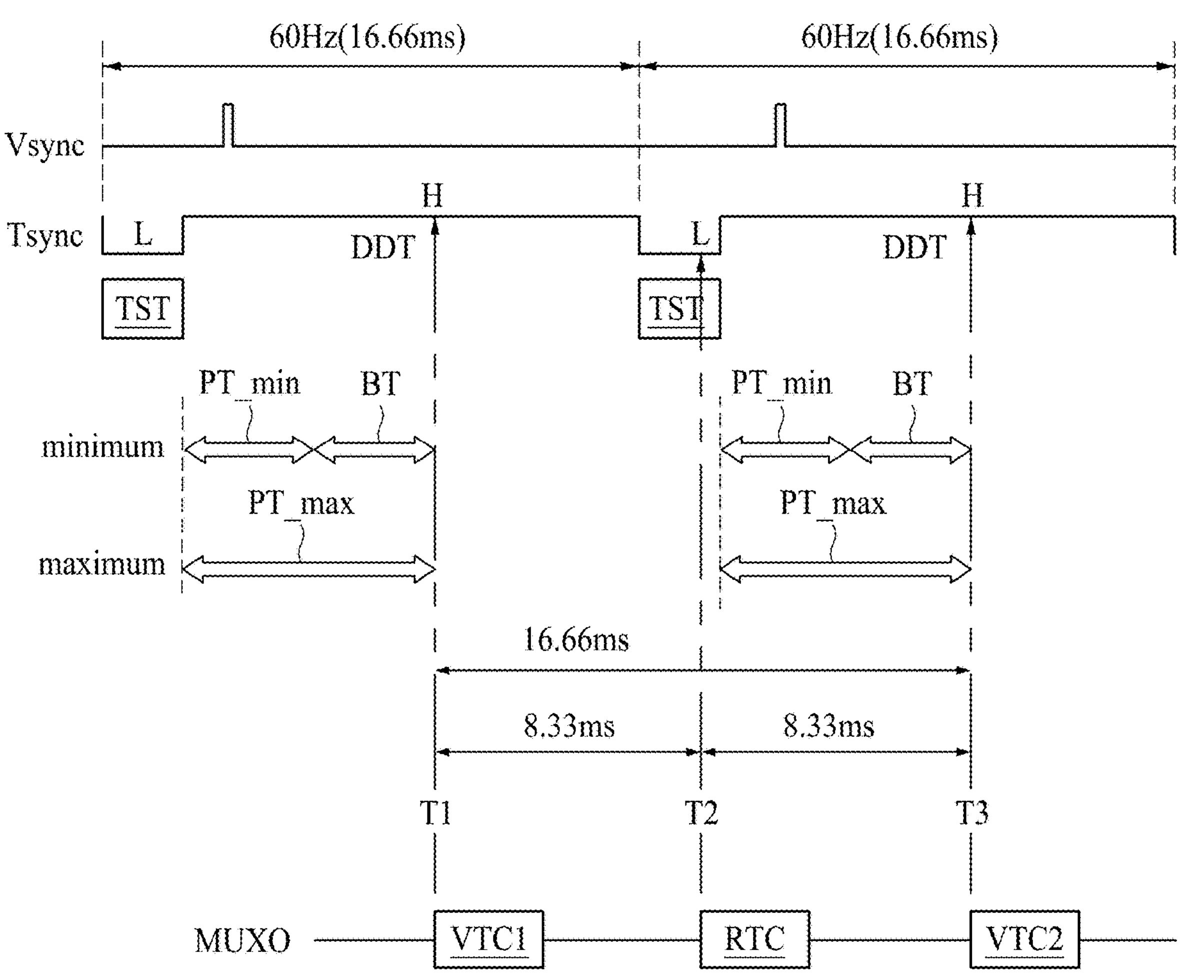
FIG. 5 is a timing diagram for describing the operation of the touch display driving device shown in FIG. 1 when a display refresh rate and a touch scan rate are a first frequency.

For example, as shown in FIG. 5, when the display refresh rate is a first frequency (for example, 60 Hz), the timing controller 210 may generate a touch synchronization signal Tsync corresponding to the display refresh rate of the first frequency (60 Hz).

Figure 6:
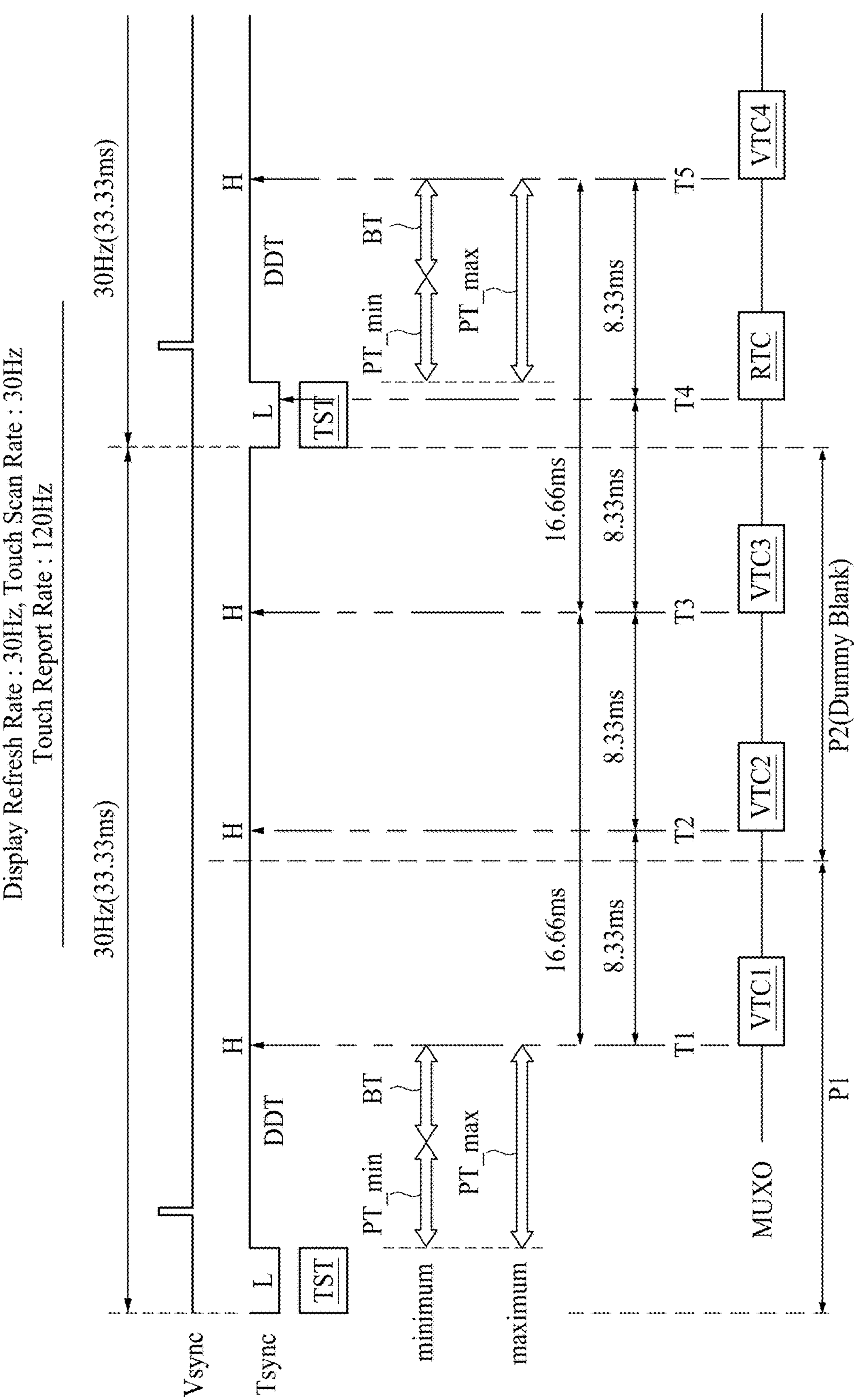
FIG. 6 is a timing diagram for describing the operation of the touch display driving device shown in FIG. 1 when the display refresh rate and the touch scan rate decrease to a third frequency according to a low-speed driving mode.

As another example, as shown in FIG. 6, the timing controller 210 may generate a touch synchronization signal Tsync corresponding to the display refresh rate of a third frequency (for example, 30 Hz) when the display refresh rate decreases to the third frequency (30 Hz).

The gate driver 220 supplies a scan signal to the gate lines G1 to Gm to turn on and off a switch (for example, a transistor) located at each pixel P. The gate driver 220 may be located on only one side of the panel 120 as shown in FIG. 1, or may be divided into two and located on both sides of the panel 120 depending on the driving method.

The gate driver 220 may include at least one gate driver integrated circuit. At least one gate driver integrated circuit may be connected to a bonding pad of the panel 120 in a tape automated bonding (TAB) method or a chip on glass (COG) method, or may be implemented as a gate in panel (GIP) type and formed directly on the panel 120, and in some cases, may be formed by being integrated into the panel 120. Further, the gate driver 220 may be implemented in a chip on film (COF) method.

The gate driver 220 may receive a gate control signal GCS, generate a gate driving signal corresponding to the gate control signal GCS, and provide the gate driving signal to the pixels P of the panel 120. The gate driver 220 may include an input buffer, a shift register, a level shifter, and an output buffer according to one embodiment. The input buffer may receive the gate control signal GCS and output the gate control signal GCS to the shift register, and the shift register may control a scan pulse which is a gate signal transmitted through the input buffer to be sequentially generated in units of columns of the panel 120. The level shifter has a function of changing an output voltage level of the shift register to have a level capable of turning on and off a thin film transistor (TFT) configured as a switch, and the output buffer may change a signal output from the level shifter and output the signal as a gate driving signal to be capable of driving the gate lines G1 to Gm having an RC load.

The data driver 230 supplies data voltage to the data lines DL to display an image on each pixel P of the panel 120. The data driver 230 may include at least one source driver integrated circuit (SDIC). At least one SDIC may be connected to the bonding pad of the panel 120 in a tape automated bonding (TAB) method or a chip on glass (COG) method, or may be formed directly on the panel 120, and in some cases, may be formed by being integrated into the panel 120. Further, the data driver 230 may be implemented in a chip on film (COF) method.

The SDIC may be configured to generate a source driving signal based on a data control signal DCS and provide the source driving signal to the pixels P of the panel 120. The SDIC may typically include a latch, a digital-to-analog converter, and an output buffer. Here, the latch stores image data according to the display control signal and provides the image data to the digital-to-analog converter, and the digital-to-analog converter may output an analog signal of a voltage corresponding to the input image data. The output buffer may transmit the output of the digital-to-analog converter as a source driving signal to the pixels P of the panel 120 through the data lines D1 to Dn.

In one embodiment, as shown in FIG. 5, the SDIC displays an image corresponding to the image data (R/G/B) input from the timing controller 210 during the period in which the touch synchronization signal Tsync is at the first level (for example, the high level) within one frame period when the display refresh rate is the first frequency (for example, 60 Hz).

Thereafter, as the touch display system 100 operates in a low refresh rate (LRR) mode, as shown in FIG. 6, when the display refresh rate decreases to the third frequency (for example, 30 Hz), the SDIC displays an image corresponding to the image data input from the timing controller 210 during a first period P1 among periods in which the touch synchronization signal Tsync is at the first level (for example, the high level) within one frame period, but during a second period P2 excluding the first period P1, an image corresponding to new image data is not output and an image which was previously output is maintained. Since a new image is not output and the previous image is maintained, the second period P2 may be defined as a dummy blank period.

The touch driver 235 drives the plurality of touch electrodes TE disposed on the panel 120 using the touch driving signal. The touch driver 235 may include a touch sensing circuit for controlling the operation of the plurality of touch electrodes TE included on the panel 120. The touch driver 235 may sense the touch or proximity of an external object to the panel 120 according to a response signal formed at the touch electrode TE in response to the touch driving signal. In this case, the touch driver 235 may recognize the proximity or touch of the object by detecting the capacitance or change in capacitance of the touch electrode TE. The touch driver 235 receives a sensing value for the touch electrode TE to generate touch raw data RawD. The touch driver 235 transmits the generated touch raw data RawD to the touch micro controller unit 240.

In one embodiment, the touch driver 235 may be implemented with a plurality of touch readout integrated circuits ROICs. Further, when the touch driver 235 is implemented with the plurality of ROICs, the SDIC and ROIC may be implemented as a single chip (SRIC: a source driver and touch readout IC).

The touch micro controller unit 240 may receive the touch synchronization signal Tsync from the timing controller 210, and control a touch scan timing of the touch driver 235 based on the touch synchronization signal Tsync. Further, the touch micro controller unit 240 calculates real touch coordinates using the touch raw data RawD transmitted from the touch driver 235. The touch micro controller unit 240 transmits (or reports) the calculated real touch coordinates to another device (for example, a host, controller, or processor).

In one embodiment, the touch micro controller unit 240 may detect the level of the touch synchronization signal Tsync for each touch report cycle generated based on the touch coordinate report rate, and output any one of the virtual touch coordinates and the real touch coordinates to the host according to the detected level.

FIG. 5 is a timing diagram for describing the operation of the touch display system shown in FIG. 1 when the display refresh rate and the touch scan rate are the first frequency (for example, 60 Hz).

Referring to FIGS. 1 and 5, when the display refresh rate is the first frequency (for example, 60 Hz), the touch scan rate (or a touch sensing rate) at which touch sensing for acquiring the real touch coordinates is performed is the first frequency (for example, 60 Hz), and the touch coordinate report rate is a second frequency (for example, 120 Hz).

In this case, the touch coordinate report rate (for example, 120 Hz) according to the present disclosure is defined as a rate at which any one of the virtual touch coordinates and the real touch coordinates are output for each touch report cycle (for example, the reciprocal of 120 Hz, that is, 8.33 ms). For convenience of description, in the present specification, times (for example, 16.66 ms, 8.33 ms, and 33.33 ms) are expressed only up to two decimal places.

When the level of the touch synchronization signal Tsync is at the second level (for example, the low level L), that is, in the touch scan period TST, the touch micro controller unit 240 controls the touch driver 235 so that the touch driver 235 performs a touch scan operation.

The touch driver 235 generates touch raw data RawD corresponding to the response signals generated by the touch electrodes TE included in the panel 120, and transmits the touch raw data RawD to the touch micro controller unit 240 according to the control of the touch micro controller unit 240.

The touch micro controller unit 240 first outputs first virtual touch coordinates VTCi (i=1) to the host, and then detects the level of the touch synchronization signal Tsync for each touch report cycle generated according to the touch coordinate report rate and outputs any one of the virtual touch coordinates and the real touch coordinates to the host based on the detected level.

Figure 4:
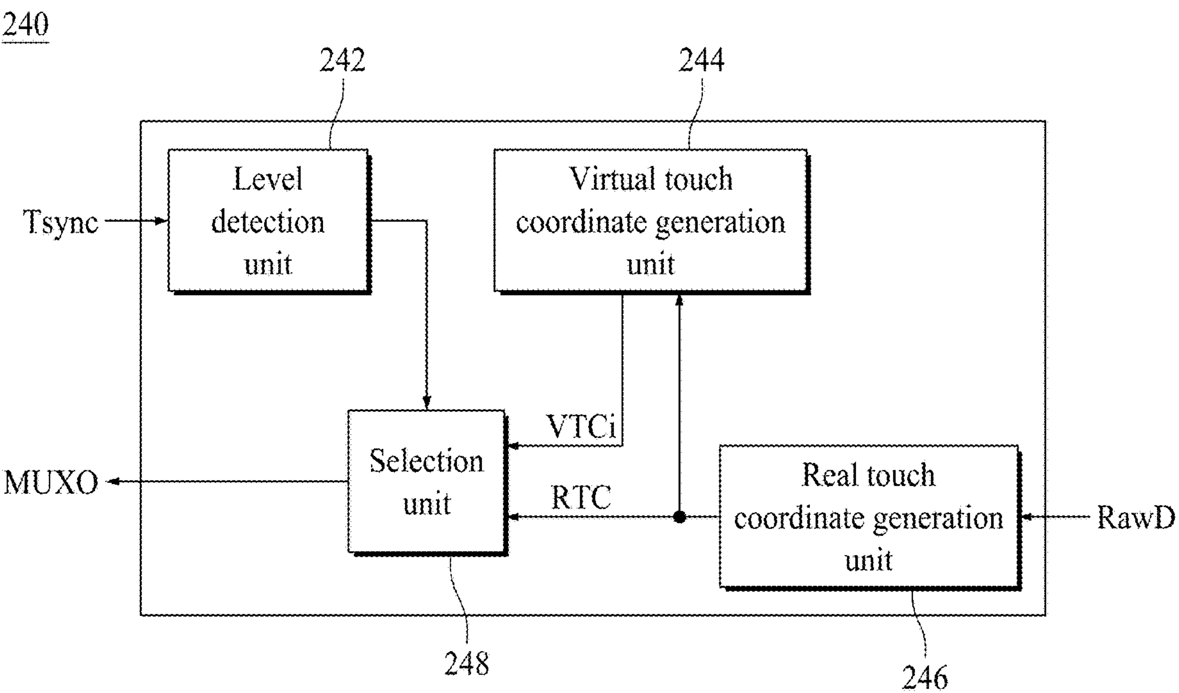
FIG. 4 is a block diagram showing a configuration of a touch micro controller unit shown in FIG. 1.

To this end, as shown in FIG. 4, the touch micro controller unit 240 includes a level detection unit 242, a virtual touch coordinate generation unit 244, a real touch coordinate generation unit 246, and a selection unit 248. In one embodiment, the level detection unit 242, the virtual touch coordinate generation unit 244, the real touch coordinate generation unit 246, and the selection unit 248 may be implemented as software executed by the touch micro controller unit 240. In another embodiment, the level detection unit 242, the virtual touch coordinate generation unit 244, the real touch coordinate generation unit 246, and the selection unit 248 may be implemented as hardware which performs the functions described in the present specification.

The level detection unit 242 calculates the touch report cycle using a timer in the touch micro controller unit 240 and detects the level of the touch synchronization signal Tsync for each calculated touch report cycle. The operation of the selection unit 248 may be controlled according to the detection result. The timer may calculate the touch report cycle using an output signal of a clock generator (or an oscillator).

The virtual touch coordinate generation unit 244 may generate each of virtual touch coordinates VTC1 and VTC2. For example, the virtual touch coordinate generation unit 244 may generate the virtual touch coordinates by interpolating previous real touch coordinates.

The real touch coordinate generation unit 246 may calculate the real touch coordinates RTC using the touch raw data RawD output from the touch driver 235 when the touch synchronization signal Tsync is at the low level.

The selection unit 248 may output any one of the virtual touch coordinates VTC1 or VTC2 and the real touch coordinates RTC to the host based on the level of the touch synchronization signal Tsync detected by the level detection unit 242 for each touch report cycle.

The selection unit 248 outputs the first virtual touch coordinates (VTCi, i=1) to the host at a first time point T1 which is a time point at which a maximum processing time PT_max among a minimum processing time PT_min and the maximum processing time PT_max, which are required to generate the real touch coordinates using the touch raw data RawD corresponding to the response signals output from the touch electrodes TE included in the panel 120 in the touch scan period TST, has elapsed. In one embodiment, the maximum processing time PT_max may be defined as a time in which a predetermined blank time BT is added to the minimum processing time PT_min.

In the present disclosure, the selection unit 248 outputs the first virtual touch coordinates at the first time point T1 which is the time point at which the maximum processing time PT_max has elapsed because the processing time may vary depending on the number of touches and thus an interval of the touch coordinates (for example, the virtual touch coordinates or the real touch coordinates) reported for each frame may not be maintained at a constant level when the touch coordinates are reported based on an actual processing time.

Accordingly, when the maximum processing time PT_max is calculated, since the selection unit 248 according to the present disclosure outputs the first virtual touch coordinates at the first time point T1 at which the calculated maximum processing time PT_max has elapsed and outputs the touch coordinates (for example, the virtual touch coordinates or the real touch coordinates) at a certain time interval (for example, 8.33 ms) thereafter (for example, a second time point T2 and a third time point T3), the time interval of reporting the touch coordinates (for example, the virtual touch coordinates or the real touch coordinates) for each frame may be uniformly maintained.

For example, the selection unit 248 outputs the first virtual touch coordinates VTC1 generated by the virtual touch coordinate generation unit 244 at the first time point T1 which is the time point at which the maximum processing time PT_max has elapsed as an output signal MUXO.

The level detection unit 242 detects the level of the touch synchronization signal Tsync at the touch report cycle (for example, 8.33 ms) calculated by the timer from the first time point T1 at which the first virtual touch coordinates VTC1 are output, that is, at the second time point T2. Since the level of the touch synchronization signal Tsync at the second time point T2 is the second level (the low level L), the selection unit 248 outputs the real touch coordinates RTC generated by the real touch coordinate generation unit 246 as the output signal MUXO according to the control of the level detection unit 242.

The level detection unit 242 detects the level of the touch synchronization signal Tsync at the touch report cycle (for example, 8.33 ms) calculated by the timer from the second time point T2 at which the real touch coordinates RTC are output, that is, at the third time point T3. Since the level of the touch synchronization signal Tsync at the third time point T3 is the first level (the high level H), the selection unit 248 outputs second virtual touch coordinates VTCi (i=2)

generated by the virtual touch coordinate generation unit 244 as the output signal MUXO according to the control of the level detection unit 242.

Meanwhile, as shown in FIG. 6, when the touch display system 100 operates in a low-speed driving mode in which the display refresh rate decreases from 60 Hz to 30 Hz, the touch scan rate also decreases from 60 Hz to 30 Hz. However, according to the present disclosure, since the touch micro controller unit 240 may report any one of the virtual touch coordinates and the real touch coordinates for each predetermined touch report cycle from the time point at which the first virtual touch coordinates VTC1 are reported, the touch coordinate report rate (for example, 120 Hz) may be maintained at a constant level regardless of changes in the display refresh rate and the touch scan rate.

Hereinafter, additionally referring to FIGS. 4 and 6, the operation of the touch display system 100 when operating in the low-speed driving mode will be described in more detail.

FIG. 6 is a timing diagram for describing the operation of the touch display system shown in FIG. 1 when the touch display system operates in the low-speed driving mode in which the display refresh rate and the touch scan rate decrease to the third frequency (for example, 30 Hz).

Compared to FIG. 5, in the case of FIG. 6, although the display refresh rate decreased to the third frequency (for example, 30 Hz) and the touch scan rate at which the touch scan for acquiring the real touch coordinates is performed also decreased to the third frequency (for example, 30 Hz), it can be seen that the touch coordinate report rate is maintained at the constant level at the second frequency (for example, 120 Hz) regardless of the changes in the display refresh rate and the touch scan rate.

As described above, the touch coordinate report rate according to the present disclosure (for example, 120 Hz) is defined as the rate at which any one of the virtual touch coordinates and the real touch coordinates are output for each touch report cycle (for example, the reciprocal of 120 Hz, that is, 8.33 ms).

When the level of the touch synchronization signal Tsync is the second level (the low level L), that is, in the touch scan period TST, the touch micro controller unit 240 generates the control signals for controlling the touch driver 235 based on the touch synchronization signal Tsync having the second level (the low level L).

The touch micro controller unit 240 first may output the first virtual touch coordinates VTC1 at the first time point T1, and then detect the level of the touch synchronization signal Tsync for touch report cycle (for example, 8.33 ms) generated based on the touch coordinate report rate (for example, 120 Hz), and output any one of the virtual touch coordinates and the real touch coordinates depending on the detected level.

The virtual touch coordinate generation unit 244 may generate each of virtual touch coordinates VTC1, VTC2, VTC3, and VTC4. For example, the virtual touch coordinate generation unit 244 may generate each of the virtual touch coordinates VTC1, VTC2, VTC3, and VTC4 by interpolating at least two previous real touch coordinates.

As shown in FIG. 6, the selection unit 248 outputs the first virtual touch coordinates VTCi (i=1) generated by the virtual touch coordinate generation unit 244 at the first time point T1, which is the time point at which the maximum processing time PT_max has elapsed, as the output signal MUXO according to the control of the level detection unit 242.

The level detection unit 242 detects the level of the touch synchronization signal Tsync at the touch report cycle (for example, 8.33 ms) calculated by the timer from the first time point T1 at which the first virtual touch coordinates VTC1 are output, that is, at the second time point T2. Since the level of the touch synchronization signal Tsync at the second time point T2 is the first level (the high level H), the selection unit 248 outputs the second virtual touch coordinates VTCi (i=2) generated by the virtual touch coordinate generation unit 244 as the output signal MUXO according to the control of the level detection unit 242.

The level detection unit 242 detects the level of the touch synchronization signal Tsync at the touch report cycle (for example, 8.33 ms) calculated by the timer from the second time point T2, that is, at the third time point T3. Since the level of the touch synchronization signal Tsync at the third time point T3 is a dummy blank period DBLANK, that is, the first level (the high level H), the selection unit 248 outputs third virtual touch coordinates VTCi (i=3) generated by the virtual touch coordinate generation unit 244 as the output signal MUXO according to the control of the level detection unit 242.

The level detection unit 242 detects the level of the touch synchronization signal Tsync at the touch report cycle (for example, 8.33 ms) calculated by the timer from the third time point T3, that is, at a fourth time point T4. Since the level of the touch synchronization signal Tsync at the fourth time point T4 is the second level (the low level L), the selection unit 248 outputs the real touch coordinates RTC generated by the real touch coordinate generation unit 246 as the output signal MUXO according to the control of the level detection unit 242.

The level detection unit 242 detects the level of the touch synchronization signal Tsync at the touch report cycle (for example, 8.33 ms) calculated by the timer from the fourth time point T4, that is, at a fifth time point T5. Since the level of the touch synchronization signal Tsync at the fifth time point T5 is the first level (the high level H), the selection unit 248 outputs fourth virtual touch coordinates VTCi (i=4) generated by the virtual touch coordinate generation unit 244 as the output signal MUXO according to the control of the level detection unit 242.

As shown in FIG. 6, even when the touch scan rate decreases to 30 Hz according to the operation in the low-speed driving mode, since the touch micro controller unit 240 outputs the virtual touch coordinates and the real touch coordinates for each touch report cycle determined according to the touch coordinate report rate (for example, 120 Hz), the touch display system 100 may stably maintain the touch coordinate report rate (for example, 120 Hz).

According to the present disclosure, since virtual touch coordinates or real touch coordinates can be reported to a host for each touch report cycle determined according to a predetermined touch coordinate report rate regardless of a display refresh rate, there is an effect that the touch coordinate report rate can be maintained at a constant level even in a low-speed driving mode in which the display refresh rate decreases.

Further, according to the present disclosure, since any one of the virtual touch coordinates and the real touch coordinates can be periodically reported to a host according to the level detection result of a touch synchronization signal which determines a touch scan period and a display driving period, there is an effect that a stable touch coordinate report rate can be maintained even in a low-speed driving mode, and thus touch performance can be improved.

In addition, according to the present disclosure, since the virtual touch coordinates are reported based on an end point of the maximum processing time required to calculate the touch coordinates according to the number of touches, and any one of the virtual touch coordinates and the real touch coordinates are reported at a constant cycle from a time point at which the first virtual touch coordinates are reported, there is an effect that the touch report can be performed at a constant cycle even when a processing time according to the number of touches varies.

It will be apparent to those skilled in the art that various modifications and variations can be made in the present disclosure without departing from the spirit or scope of the disclosures. Thus, it is intended that the present disclosure covers the modifications and variations of this disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A touch display driving device comprising:

a touch driver that performs a touch scan for acquiring real touch coordinates when a touch synchronization signal that determines a touch scan period and a display driving period is at a first level; and a touch micro controller unit that reports virtual touch coordinates at an end point of a processing time for calculating the real touch coordinates, detects a level of the touch synchronization signal for each touch report cycle determined according to a predetermined touch coordinate report rate after the end point, and reports any one of the virtual touch coordinates and the real touch coordinates depending on the detected level of the touch synchronization signal.

2. The touch display driving device of claim 1, wherein the touch micro controller unit reports the virtual touch coordinates when the detected level of the touch synchronization signal is a second level, and reports the real touch coordinates when the detected level of the touch synchronization signal is the first level, the first level is one of a low level and a high level, and the second level is the other of the low level and the high level.

3. The touch display driving device of claim 1, wherein the touch micro controller unit sets the touch coordinate report rate to a second frequency higher than a first frequency when a display refresh rate and a touch scan rate for acquiring the real touch coordinates are the first frequency, and maintains the touch coordinate report rate at the second frequency when the display refresh rate and the touch scan rate decrease to a third frequency lower than the first frequency according to a low-speed driving mode.

4. The touch display driving device of claim 1, wherein the touch driver generates touch raw data for acquiring the real touch coordinates from a plurality of touch electrodes included in an in-cell type panel.

5. The touch display driving device of claim 4, wherein the touch driver generates touch raw data corresponding to response signals output from the plurality of touch electrodes during the touch scan period in which the touch synchronization signal is maintained at the first level, and the touch micro controller unit includes a real touch coordinate generation unit that generates the real touch coordinates using the touch raw data.

6. The touch display driving device of claim 4, wherein the processing time includes a first time at which the real touch coordinates are calculated using the touch raw data and a blank time that is determined based on a maximum processing time required to calculate the real touch coordinates.

7. The touch display driving device of claim 6, wherein the first time varies depending on the number of touches.

8. The touch display driving device of claim 1, wherein the touch micro controller unit includes:

a level detection unit that detects the level of the touch synchronization signal for each touch report cycle;

a virtual touch coordinate generation unit that generates the virtual touch coordinates using a plurality of previously calculated real touch coordinates; and a selection unit that outputs any one of the virtual touch coordinates and the real touch coordinates based on the detection result of the level detection unit.

9. The touch display driving device of claim 1, further comprising:

a data driver that displays an image during the display driving period in which the touch synchronization signal is maintained at a second level; and a timing controller that generates the touch synchronization signal and transmits image data to the data driver.

10. The touch display driving device of claim 9, wherein the data driver displays an image corresponding to the image data input from the timing controller during the period in which the touch synchronization signal is at the second level within a unit frame period when a display refresh rate is a first frequency.

11. The touch display driving device of claim 9, wherein, when a display refresh rate decreases from a first frequency to a third frequency, the data driver displays an image corresponding to input image data input from the outside during a first period among the periods in which the touch synchronization signal is at the second level in a unit frame period, and maintains a previous image during the remaining second period excluding the first period.

12. The touch display driving device of claim 9, wherein the timing controller generates the touch synchronization signal and transmits the touch synchronization signal to the touch micro controller unit through a general purpose input/output (GPIO) pin.

13. The touch display driving device of claim 1, further comprising a data driver that displays an image during the display driving period in which the touch synchronization signal is maintained at a second level, wherein the touch driver and the data driver are implemented as a single chip.

14. A touch display driving method comprising:

performing a touch scan to generate touch raw data during a touch scan period in which a touch synchronization signal is maintained at a first level;

generating real touch coordinates using the touch raw data;

reporting virtual touch coordinates at a time point of generating the real touch coordinates;

detecting a level of the touch synchronization signal for each touch report cycle determined according to a predetermined touch coordinate report rate; and reporting any one of the virtual touch coordinates and the real touch coordinates depending on the detected level.

15. The touch display driving method of claim 14, wherein, in the reporting of any one of the virtual touch coordinates and the real touch coordinates, the virtual touch coordinates are reported when the detected level of the touch synchronization signal is a second level and the real touch coordinates are reported when the detected level of the touch synchronization signal is the first level, the first level is any one of a low level and a high level, and the second level is the other of the low level and the high level.

16. The touch display driving method of claim 14, wherein the touch coordinate report rate is set to a second frequency higher than a first frequency when a display refresh rate and a touch scan rate for acquiring the real touch coordinates are the first frequency, and is maintained at the second frequency when the display refresh rate and the touch scan rate decrease to a third frequency lower than the first frequency.

17. The touch display driving method of claim 14, wherein the real touch coordinates are calculated during a processing time including a first time at which the real touch coordinates are calculated using the touch raw data and a blank time that is determined based on a maximum processing time required to calculate the real touch coordinates.

18. The touch display driving method of claim 14, further comprising displaying an image during a display driving period in which the touch synchronization signal is maintained at a second level.

19. The touch display driving method of claim 18, wherein, in the displaying of the image, an image, corresponding to image data input from the outside during the period in which the touch synchronization signal is at the second level in a unit frame period when a display refresh rate is a first frequency, is displayed.

20. The touch display driving method of claim 18, wherein, in the displaying of the image, when a display refresh rate decreases from a first frequency to a third frequency, an image, corresponding to input image data input from the outside during a first period among the periods in which the touch synchronization signal is at the second level in a unit frame period, is displayed, and a previous image is maintained during the remaining second period excluding the first period.

* * * * *